L. S. EDMONDS.
STOVE LID LIFTER.
APPLICATION FILED APR. 25, 1916.
1,225,601.
Patented May 8, 1917.
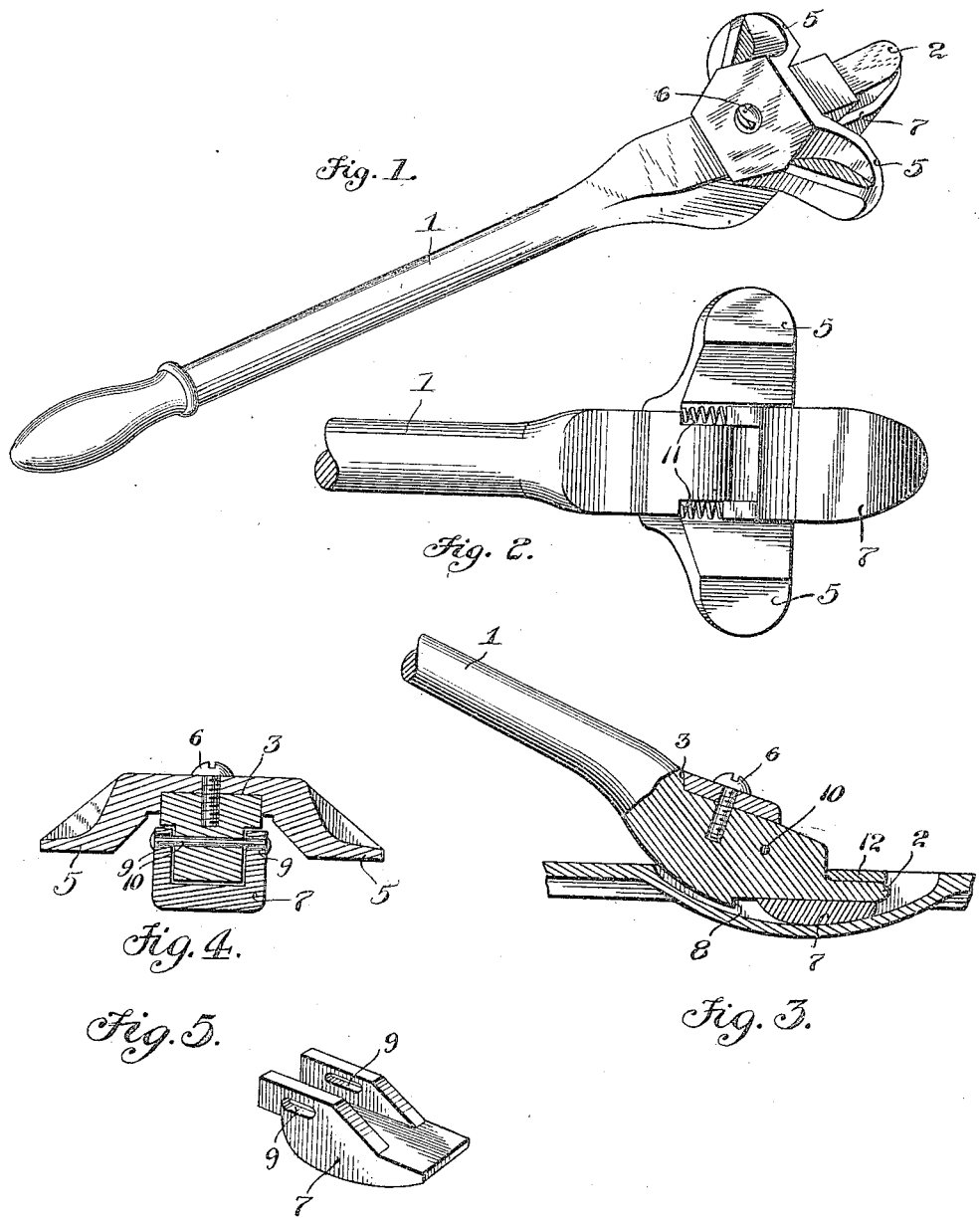

UNITED STATES PATENT OFFICE.

LABEN STAFORD EDMONDS, OF CHAPMANVILLE, WEST VIRGINIA.

STOVE-LID LIFTER.

1,225,601.   Specification of Letters Patent.   Patented May 8, 1917.

Application filed April 25, 1916. Serial No. 93,491.

*To all whom it may concern:*

Be it known that I, LABEN S. EDMONDS, a citizen of the United States, residing at Chapmanville, in the county of Logan and State of West Virginia, have invented new and useful Improvements in Stove-Lid Lifters, of which the following is a specification.

This invention relates to a stove lid lifter and has for its primary object to provide a device of this character in which the lifter is so associated with the lid that the lid will be prevented from accidentally moving from the lifter when pressure is applied to the latter.

An object of the invention is the provision of a slidable rest capable of accommodating itself in the recess of the lid so that the lid will be positively held against movement during the operation of the lifter.

With these and other objects in view the invention will be better understood from the following detailed description taken in connection with the accompanying drawing wherein Figure 1 is a perspective view of the device.

Fig. 2 is a bottom plan view thereof.

Fig. 3 is a longitudinal sectional view showing the device coöperating with the lid.

Fig. 4 is a cross sectional view.

Fig. 5 is a perspective view of the rest.

Referring to the drawing, the numeral 1 designates a handle having a lid engaging lip 2 formed at one end thereof. This handle at an intermediate point is formed with a recess 3 in which is mounted a portion of a foot 5 which also embraces two sides of the handle. For detachably associating the foot with the handle, I provide a screw 6 that passes through the foot and engages with the handle.

The numeral 7 designates a rest of U-shape formation so as to embrace the bottom and side walls of the handle and the rest is limited in its rearward movement by means of a shoulder 8 upon the handle engaging a portion of the rest when the latter has traveled rearwardly a predetermined distance. For properly associating the rest with the handle so as to accommodate sliding movement, I provide the rest with a pair of slots 9 each coöperating with a pin 10 secured in a side of the handle. A pair of coil springs 11 are shown for the purpose of forcing the rest in a direction toward the lip. The purpose of the rest and mounting it as illustrated is to completely fill the recess in the plate and to properly associate the lip with the lugs 12 of the lid.

It is to be understood that the structural embodiment of the invention as a whole and its various features as shown is merely illustrative and not restrictive, since I am well aware that many of the details of construction can be widely varied without departing from the spirit of the invention and certain of the elements may be used in other relations. I therefore desire not to be limited in these particulars or in any others except as set forth in the appended claims.

What I claim is:

1. A stove lid lifter comprising a handle supporting a lip, a foot detachably secured to the handle and an adjustable element associated with said lip.

2. A stove lid lifter comprising a handle formed with a lid engaging lip, a foot detachably secured to the handle adjacent said lip and a rest slidably mounted on the handle contiguous said lip.

3. A stove lid lifter comprising a handle formed with a lid engaging lip, a foot detachably secured to the handle adjacent said lip and a rest having a pin and slot connection with said handle.

4. A stove lid lifter comprising a handle formed with a lid engaging lip, a foot detachably secured to the handle adjacent said lip and a rest U-shape in cross section and embracing three sides of the handle, said rest having a pin and slot connection with the handle.

In testimony whereof I affix my signature.

LABEN STAFORD EDMONDS.

Copies of this patent may be obtained for five cents each, by addressing the "Commissioner of Patents, Washington, D. C."